United States Patent
Hom et al.

(10) Patent No.: US 9,514,153 B2
(45) Date of Patent: *Dec. 6, 2016

(54) VIRTUAL ATTRIBUTE FEDERATION SYSTEM

(71) Applicant: International Business Machines Corporation, Armonk, NY (US)

(72) Inventors: Richard V. Hom, Troy, MI (US); Eric M. Nelson, Durham, NC (US); David C. Roxin, Baltimore, MD (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/062,306

(22) Filed: Mar. 7, 2016

(65) Prior Publication Data

US 2016/0188629 A1 Jun. 30, 2016

Related U.S. Application Data

(63) Continuation of application No. 12/954,390, filed on Nov. 24, 2010, now Pat. No. 9,311,370.

(51) Int. Cl.
*G06F 7/00* (2006.01)
*G06F 17/00* (2006.01)
*G06F 17/30* (2006.01)
*G06F 9/455* (2006.01)

(52) U.S. Cl.
CPC ..... *G06F 17/30233* (2013.01); *G06F 9/45558* (2013.01); *G06F 17/30566* (2013.01); *G06F 2009/45583* (2013.01)

(58) Field of Classification Search
CPC .............. G06F 9/4558; G06F 17/30566; G06F 17/30233
USPC ......................................... 707/707, 769, 831
See application file for complete search history.

(56) References Cited

U.S. PATENT DOCUMENTS

| | | |
|---|---|---|
| 5,361,349 A | 11/1994 | Sugita et al. |
| 6,345,266 B1 | 2/2002 | Ganguly et al. |
| 6,745,206 B2 | 6/2004 | Mandler et al. |
| 7,043,472 B2 | 5/2006 | Aridor et al. |
| 7,620,630 B2 | 11/2009 | Lloyd et al. |
| 8,145,616 B2 | 3/2012 | Rowley |
| 8,589,338 B2 | 11/2013 | Maes |

(Continued)

OTHER PUBLICATIONS

Gemmill et al., "Cross-Domain Authorization for Federated Virtual Organizations Using the myVocs Collaboration Environment", CPE-07-0128.R1, http://mc.manuscriptcentral.com/cpe, Mar. 13, 2008, 27 pages.

(Continued)

*Primary Examiner* — Md. I Uddin
(74) *Attorney, Agent, or Firm* — John R. Pivnichny; Madeline F. Schiesser; Keohane & D'Alessandro PLLC (57) ABSTRACT

The present invention may comprise a system and method for a Virtual Attribute Federation System (VAFS) and may be composed of a Virtual Attribute Federation Manager (VAFM) and a system of Virtual Attribute Enabled Directories (VAED) modified to accept federation of virtual attributes. The VAFM produces signed and trusted calculation methods and coordinates a synchronized dispersal of these methods to the VAEDs. The VAEDs may have local mappings which allow for federation-time configuration of the calculation methods.

16 Claims, 8 Drawing Sheets

(56) References Cited

U.S. PATENT DOCUMENTS

| | | |
|---|---|---|
| 2003/0088678 A1 | 5/2003 | Boreham et al. |
| 2003/0110188 A1* | 6/2003 | Howard ............ G06F 17/30126 |
| 2004/0034683 A1 | 2/2004 | Zhao et al. |
| 2009/0064287 A1 | 3/2009 | Bagepalli et al. |
| 2009/0112875 A1 | 4/2009 | Maes |
| 2012/0131077 A1 | 5/2012 | Hom et al. |

OTHER PUBLICATIONS

Hu et al., "Identity Federation in Federated Trust Healthcare Network", 2004-2005, 9 pages.

Khan et al., "Negotiation Based on Individualization: Incorporating Personlization into Federation", Copyright 2007 IEEE, 6 pages.

Kouril et al., "A Federated Framework for Secure Collaborative Systems", 2008-2009, 9 pages.

Chad La Joie, "Federation Systems, ADFS, & Shibboleth 2.0", 2009-2010, 10 pages.

Yamaji et al., "Attribute Aggregating System for Shibboleth based Access Management Federation", 2010 10th Annual International Symposium on Applications and the Internet, pp. 281-284.

Uddin, Md I., USPTO Office Action, U.S. Appl. No. 12/954,390, Mail Date Mar. 19, 2012, 12 pages.

Uddin, Md I., USPTO Final Office Action, U.S. Appl. No. 12/954,390, Mail Date Jul. 23, 2012, 12 pages.

Uddin, Md I., USPTO Office Action, U.S. Appl. No. 12/954,390, Notification Date Dec. 4, 2013, 23 pages.

Uddin, Md I., USPTO Final Office Action, U.S. Appl. No. 12/954,390, Notification Date May 15, 2014, 16 pages.

Uddin, Md I., USPTO Office Action, U.S. Appl. No. 12/954,390, Notification Date Mar. 4, 2015, 14 pages.

Uddin, Md I., USPTO Final Office Action, U.S. Appl. No. 12/954,390, Notification Date Sep. 24, 2015, 15 pages.

Uddin, Md I., USPTO Notice of Allowance and Fee(s) Due, U.S. Appl. No. 12/954,390, Date Mailed Jan. 15, 2016, 8 pages.

* cited by examiner

VIRTUAL ATTRIBUTE FEDERATION SYSTEM

CROSS-REFERENCE TO RELATED APPLICATIONS

The present patent document is a continuation of U.S. patent application Ser. No. 12/954,390, filed Nov. 24, 2010, entitled "VIRTUAL ATTRIBUTE FEDERATION SYSTEM", the disclosure of which is incorporated herein by reference.

FIELD OF THE INVENTION

One aspect of the present invention provides for a method and a system for virtual attribute federation that produces a consistent result at multiple directories, works in different domains across the enterprise, supports the retrieval of information from alternate sources in differing IT environments, supports different directory structures; protect the directory from compromised calculation methods, and reduces processor and network load.

BACKGROUND OF THE INVENTION

Large enterprises, using directories with virtual attributes (attributes whose values do not reside in the directory), need a way to federate virtual attributes across directories in different domains in a manner in which they can provide consistent results in any environment. Federation of virtual attributes poses unique challenges due to the dynamic nature of the virtual attribute. Unlike normal attributes, the virtual attribute does not have a physical value that can be propagated. Also, the virtual value may change rapidly. Propagating the virtual value through traditional directory integration causes problems because by the time the values are propagated they may already be stale or out of date.

Just In Time (JIT) directory integration provides an option, but every level of indirection adds latency, processor load, and bandwidth load. Database federation would not work because the operating environments (e.g., directory structure, external ports) differ for different directories and would cause problems for the calculation method.

What is needed is a system and method for virtual attribute federation that produces a consistent result at multiple directories, works in different domains across the enterprise, supports the retrieval of information from alternate sources in differing IT environments, supports different directory structures; protect the directory from compromised calculation methods, and reduces processor and network load.

Therefore, there exists a need for a solution that solves at least one of the deficiencies of the related art.

SUMMARY OF THE INVENTION

The present invention may comprise a system and method for a Virtual Attribute Federation System (VAFS) and may be composed of a Virtual Attribute Federation Manager (VAFM) and a system of Virtual Attribute Enabled Directories (VAED) modified to accept federation of virtual attributes. The VAFM produces signed and trusted calculation methods and coordinates a synchronized dispersal of these methods to the VAEDs. The VAEDs may have local mappings which allow for federation-time configuration of the calculation methods.

Unlike the alternatives, the present invention provides the ability to federate virtual attributes into VAEDs that are in multiple domains, connect to different data sources (with different credentials) in each environment, and have object identities that vary from VAED to VAED. It can protect the VAEDs from compromised calculation methods. It increases performance by not incurring run-time delays and reduces overall processor and network load.

One aspect of the present invention includes a computer system for virtual attribute federation, the computer system comprising: a memory medium comprising program instructions; a bus coupled to the memory medium; and a processor for executing the program instructions comprising a virtual attribute federation manager (VAFM), the instructions causing the system to: sign an instance of a virtual attribute and a value calculation method with a signature; federate the instance of the virtual attribute across each of a plurality of virtual attribute enabled directories (VAEDs) by mapping, for the virtual attribute according to the value calculation method, a federated instance external to the VAEDs to a local instance internal to the VAEDs, wherein at least one of the VAEDs is in a different domain than at least one other of the VAEDs; and execute, at each VAED, in response to a recognition by the VAED of the signature, the virtual attribute and value calculation method in a restricted environment, the restricted environment being abstracted by a resource map and external ports and the restricted environment preventing the value calculation method from at least one of: transmitting information outside of the VAED, reading information outside of the VAED except through the set of external ports, changing information in the attribute store, and accessing information that an executing user identity does not have access to from outside the VAED.

Another aspect of the present invention includes a computer-implemented method for virtual attribute federation, comprising: signing an instance of a virtual attribute and a value calculation method with a signature; federating the instance of the virtual attribute across each of a plurality of virtual attribute enabled directories (VAEDs) by mapping, for the virtual attribute according to the value calculation method, a federated instance external to the VAEDs to a local instance internal to the VAEDs, wherein at least one of the VAEDs is in a different domain than at least one other of the VAEDs; and executing, at each VAED, in response to a recognition by the VAED of the signature, the virtual attribute and value calculation method in a restricted environment, the restricted environment being abstracted by a resource map and external ports and the restricted environment preventing the value calculation method from at least one of: transmitting information outside of the VAED, reading information outside of the VAED except through the set of external ports, changing information in the attribute store, and accessing information that an executing user identity does not have access to from outside the VAED.

Yet another aspect of the present invention includes a computer program product for virtual attribute federation, the computer program product comprising a computer readable storage device, and program instructions stored on the computer readable storage device, to: sign an instance of a virtual attribute and a value calculation method with a signature; federate the instance of the virtual attribute across each of a plurality of virtual attribute enabled directories (VAEDs) by mapping, for the virtual attribute according to the value calculation method, a federated instance external to the VAEDs to a local instance internal to the VAEDs, wherein at least one of the VAEDs is in a different domain than at least one other of the VAEDs; and execute, at each VAED, in response to a recognition by the VAED of the signature, the virtual attribute and value calculation method in a restricted environment, the restricted environment being abstracted by a resource map and external ports and the restricted environment preventing the value calculation method from at least one of: transmitting information outside of the VAED, reading information outside of the VAED except through the set of external ports, changing information in the attribute store, and accessing information that an executing user identity does not have access to from outside the VAED.

BRIEF DESCRIPTION OF THE DRAWINGS

These and other features of this invention will be more readily understood from the following detailed description of the various aspects of the invention taken in conjunction with the accompanying drawings in which.

The drawings are merely schematic representations, not intended to portray specific parameters of the invention. The drawings are intended to depict only typical embodiments of the invention, and therefore should not be considered as limiting the scope of the invention.

DETAILED DESCRIPTION OF THE DRAWINGS

Figure 1A:
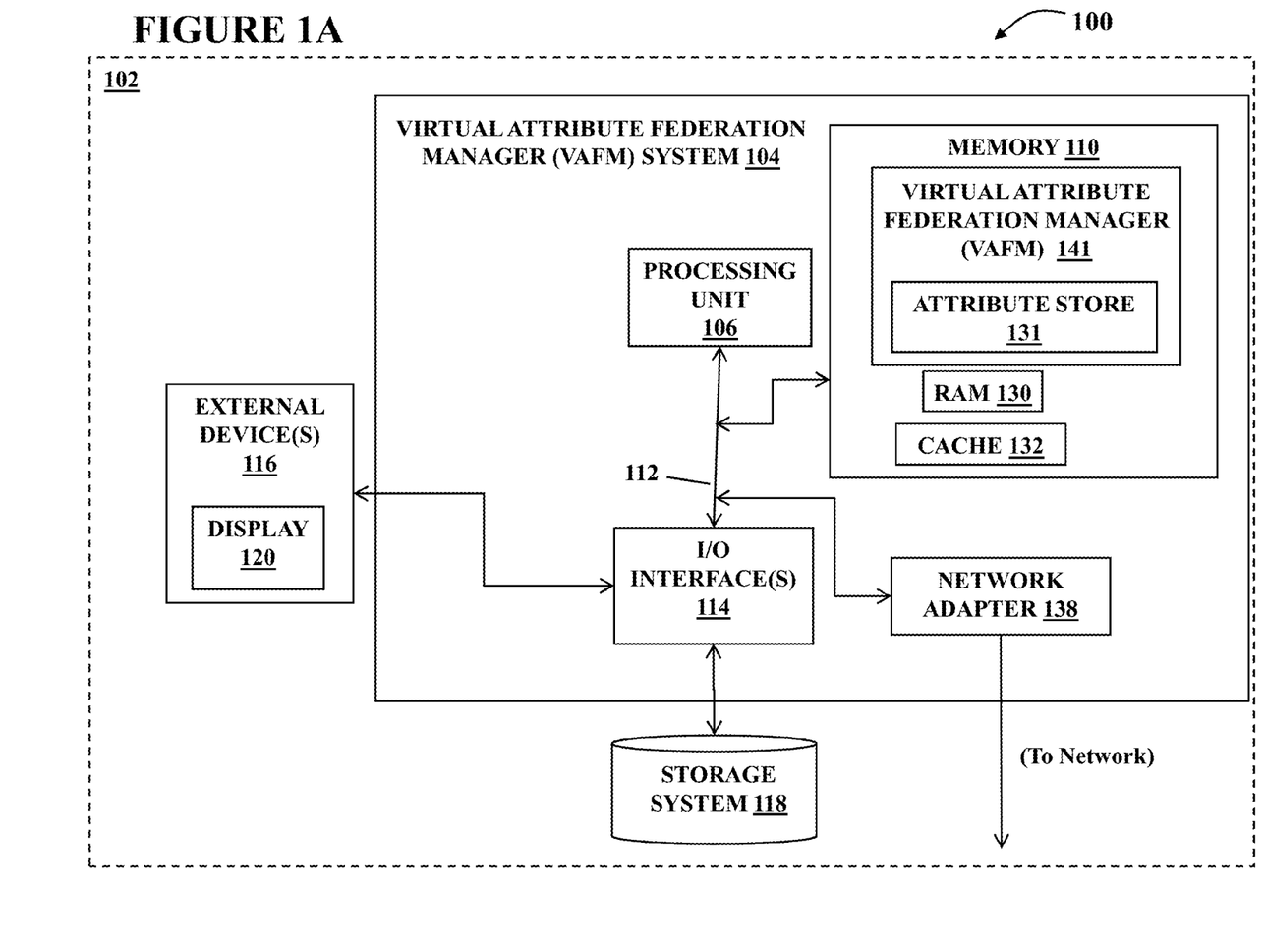
FIG. 1A illustrates the use of a Virtual Attribute Federation Manager (VAFM) of the present invention.

FIG. 1A shows Structure 100 having Data Processing System 102, suitable for storing and/or executing program code of the present invention may include Virtual Attribute Federation Manager (VAFM) System 104 and at least one processor (Processing Unit 106) coupled directly or indirectly to Memory 110 through System Bus 112. Memory 110 may include Virtual Attribute Federation Manager 141 having Attribute Store 131, local memory (RAM 130) employed during actual execution of the program code and cache memories (Cache 132) that provide temporary storage of at least some program code in order to reduce the number of times code must be retrieved from bulk storage (Storage System 118), during execution. Input/output or I/O devices (External Devices 116) (including but not limited to keyboards, displays (Display 120), pointing devices, etc.) can be coupled to Virtual Attribute Federation Manager (VAFM) System 104, either directly or indirectly through a network (see FIG. 2) through intervening I/O controllers (I/O interface(s) 114).

Figure 1B:
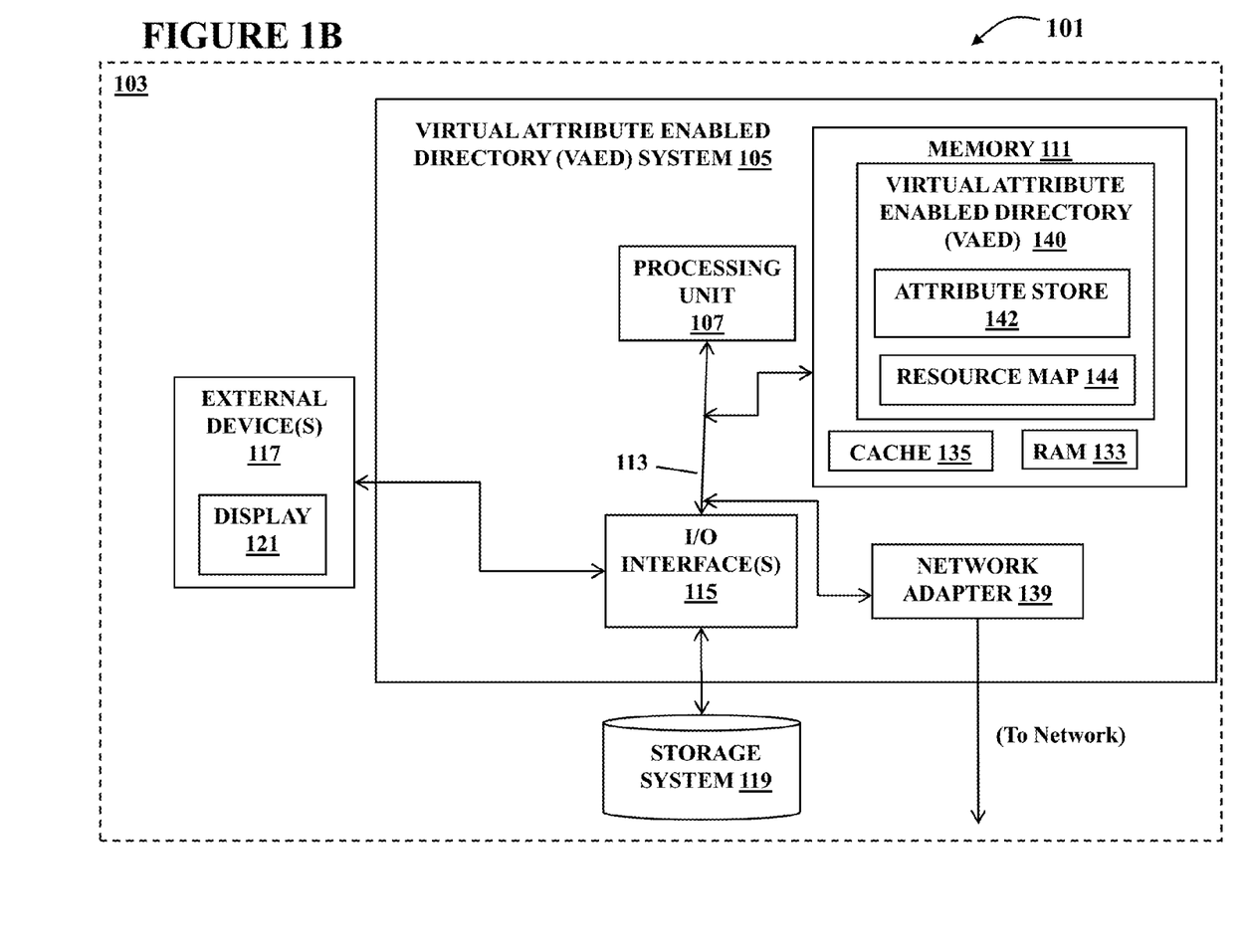
FIG. 1B illustrates the use of a Virtual Attribute Enabled Directory (VAED) of the present invention.

FIG. 1B shows Structure 101 wherein a Virtual Attribute Enabled Directory (VAED) 140 works within System 103 and within Virtual Attribute Enabled Directory (VAED) System 105. Memory 111 in this case has Virtual Attribute Enabled Directory (VAED) 140 that has Attribute Store 142 and Resource Map 144, local memory (RAM 133) employed during actual execution of the program code and cache memories (Cache 135) that provide temporary storage of at least some program code in order to reduce the number of times code must be retrieved from bulk storage (Storage System 119), during execution. Input/output or I/O devices (External Devices 117) (including but not limited to keyboards, displays (Display 121), pointing devices, etc.) can be coupled to Virtual Attribute Enabled Directory (VAED) System 105, either directly or indirectly through a network (see FIG. 2) through intervening I/O controllers (I/O interface(s) 115).

Figure 2:
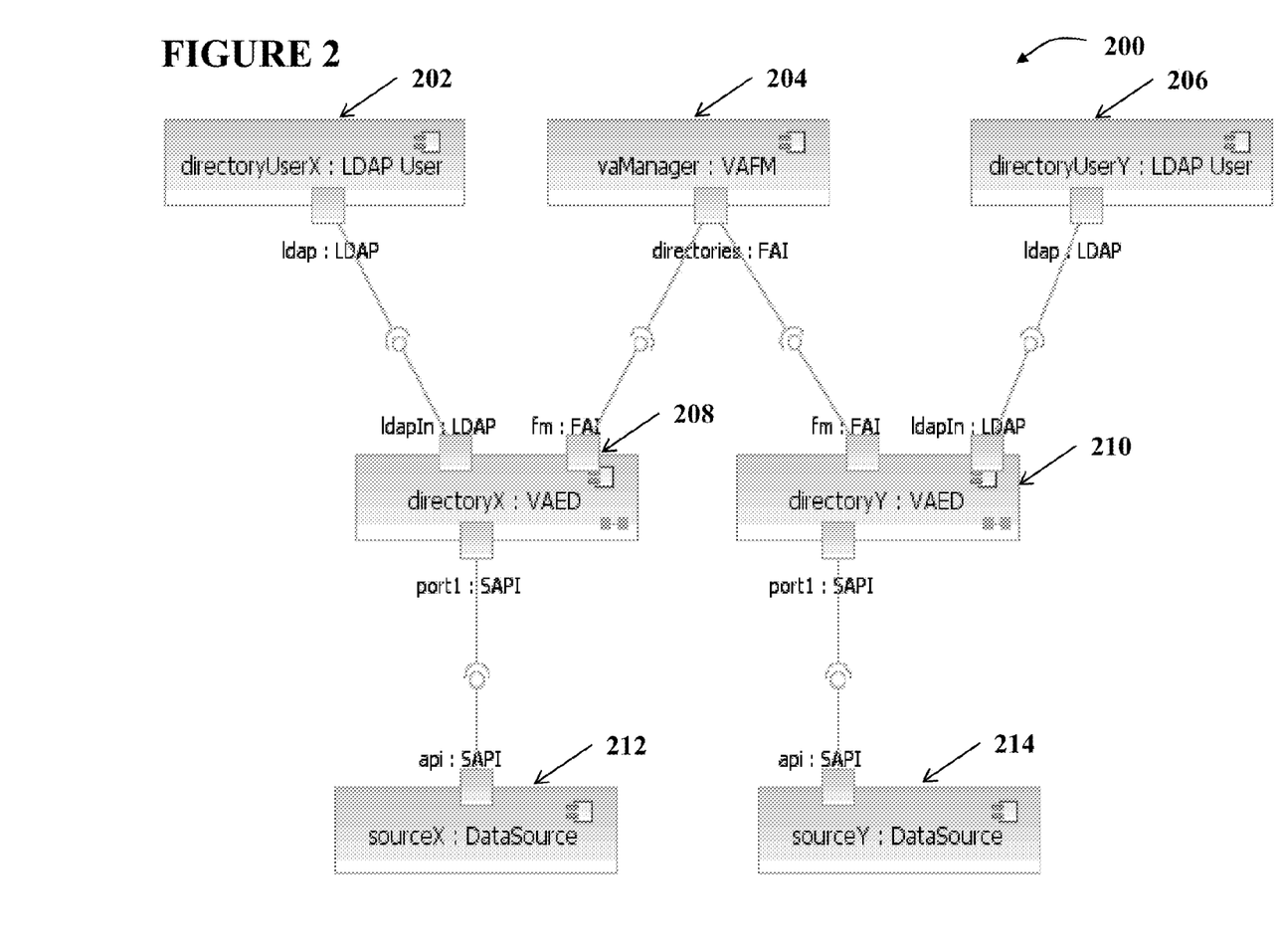
FIG. 2 illustrates both the VAFM and VAEDs having attribute stores.

FIG. 2 is an example and an arbitrary number of directory users may connect to a VAED 208, 210. VAFM 204 may federate with an arbitrary number of VAEDs A DataSource 212, 214 may be used by an arbitrary number of VAEDs 208, 210. VAED 208, 210 may use an arbitrary number of DataSources 212, 214. VAFM 104 uses a Federated Attribute Interface (FAI) 205 to communicate the changes of the virtual attributes to the VAED instances. For the sake of illustration, the VAED instances 208, 210 in FIG. 2 communicate with different instances of the same DataSource 212, 214. VAEDs 208, 210 also communicate with directory clients 202, 206.

As shown in FIG. 2, attribute stores 212, 214 are contained internally within the VAEDs. The Data Sources 212 and 214 are something outside of the system like a thermometer or Geiger counter, for example. The attribute store of the VAFM 204 provides a central location for the directory object 302 (FIG. 3) and its virtual attributes.

Figure 3:
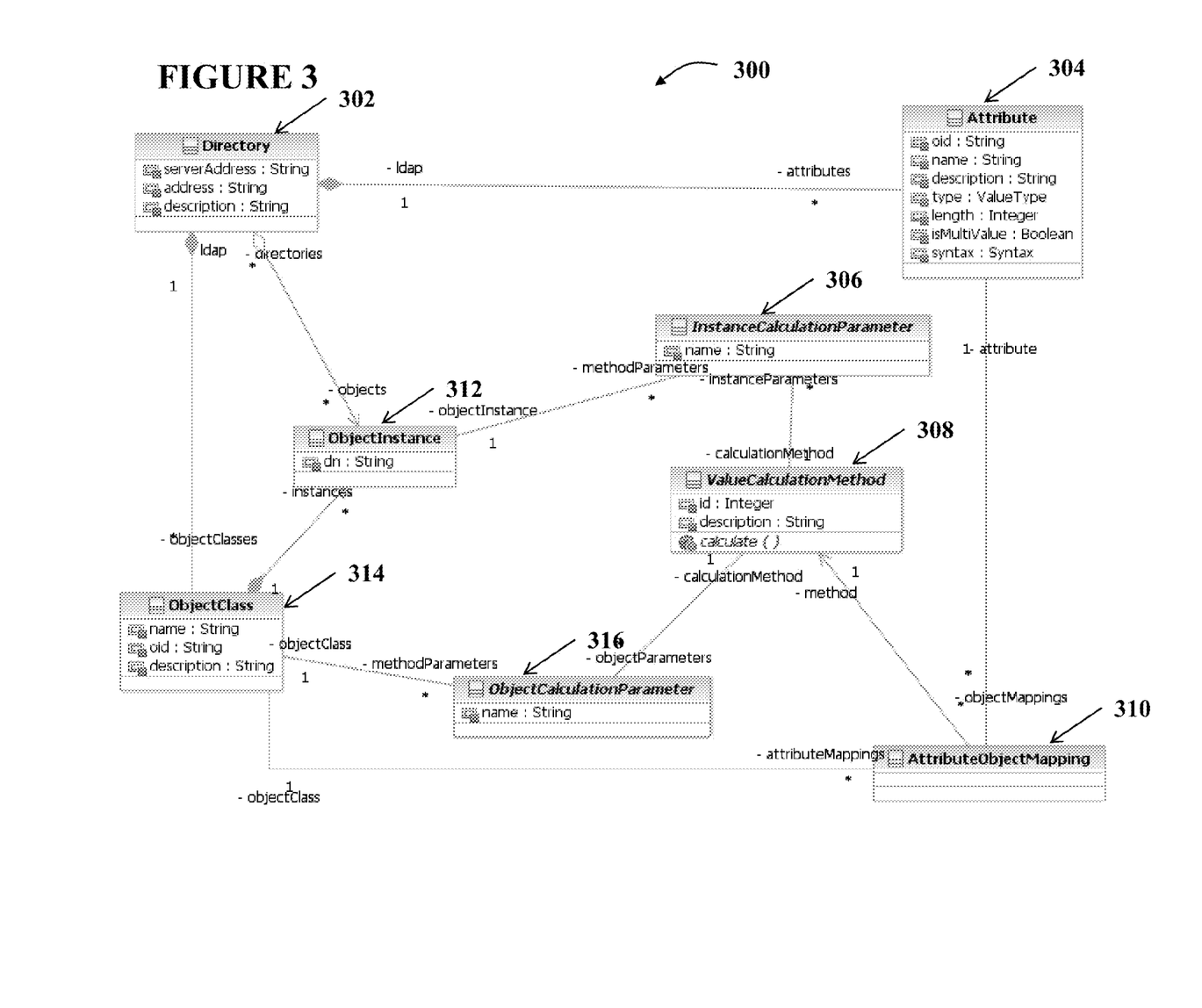
FIG. 3 illustrates the VAED attribute store of the present invention that contains the structures needed for a functional directory.
Figure 4:
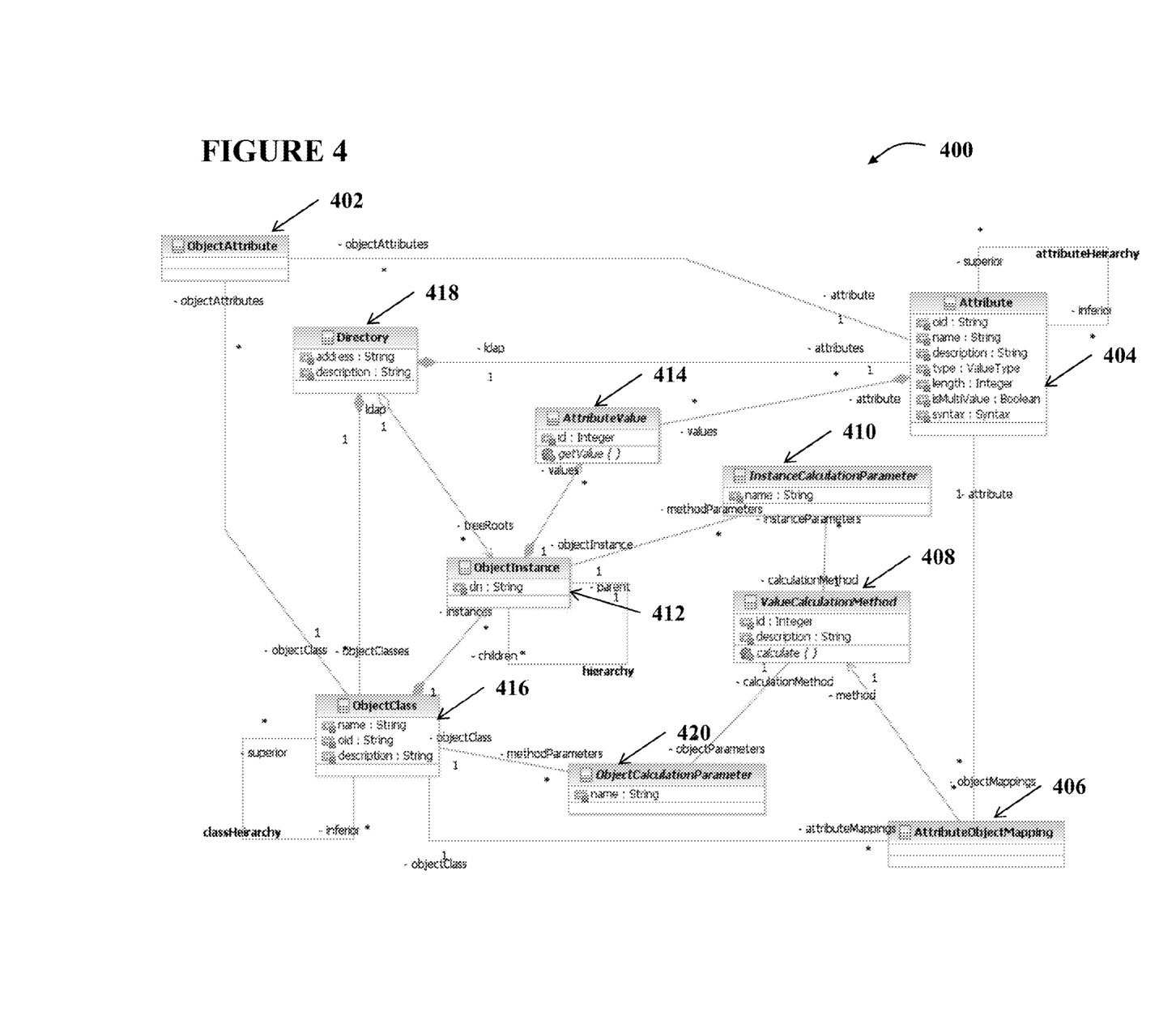
FIG. 4 shows the VAED attribute store of the present invention that contains an AttributeStore and a ResourceMap internally.

Structurally, the VAFM attribute store 300 is similar to the VAED attribute store 400 (FIG. 4). FIG. 4 illustrates VAED Attribute Store 400 having Object Attribute element 402. VAED Attribute Store 400 further has Attribute 404, contained by Directory 418. Attribute Value instance 414 contains the values for a pair of Attribute 404 and Object Instance 412. Attribute Object Mapping instance 406 stores the relationship between Attribute 404 and Object Class 416. Instance Parameter Calculator 410 provides the Object Instance 412 level information to Value Calculation Method 408. Object Calculation Parameter 420 provides the Object Class 416 level information to Value Calculation Method 408.

VAFM 204 Attribute Store lacks the Attribute Value 414 for non-virtual attributes because these values can be propagated through traditional directory integration techniques. Many relationships are also missing in VAFM 204. Attribute Store 404 are stored as they are only needed in a functioning directory. VAFM 204 Attribute Store has a server Address that the VAFM 204 uses to connect to VAEDs 208 and 210 that need updating. It may also contain encrypted user ID and password for connecting to the VAEDs 208 and 210.

The VAED attribute store 400 contains the structures needed for a functional directory 208, 210. Directories 208, 210 attribute store 400 lack the server Address attribute since the attribute store resides on a VAED server. The VAFM Object Instance 312 is mapped to the Object Instance 412 of the VAEDs 208 and 210 via the Directory 302. Within the VAFM Attribute Store 300, the Attribute Object Mapping 310 identifies which Value Calculation Method 308 to use for a specific Attribute 304 of an ObjectClass 314.

Figure 5:
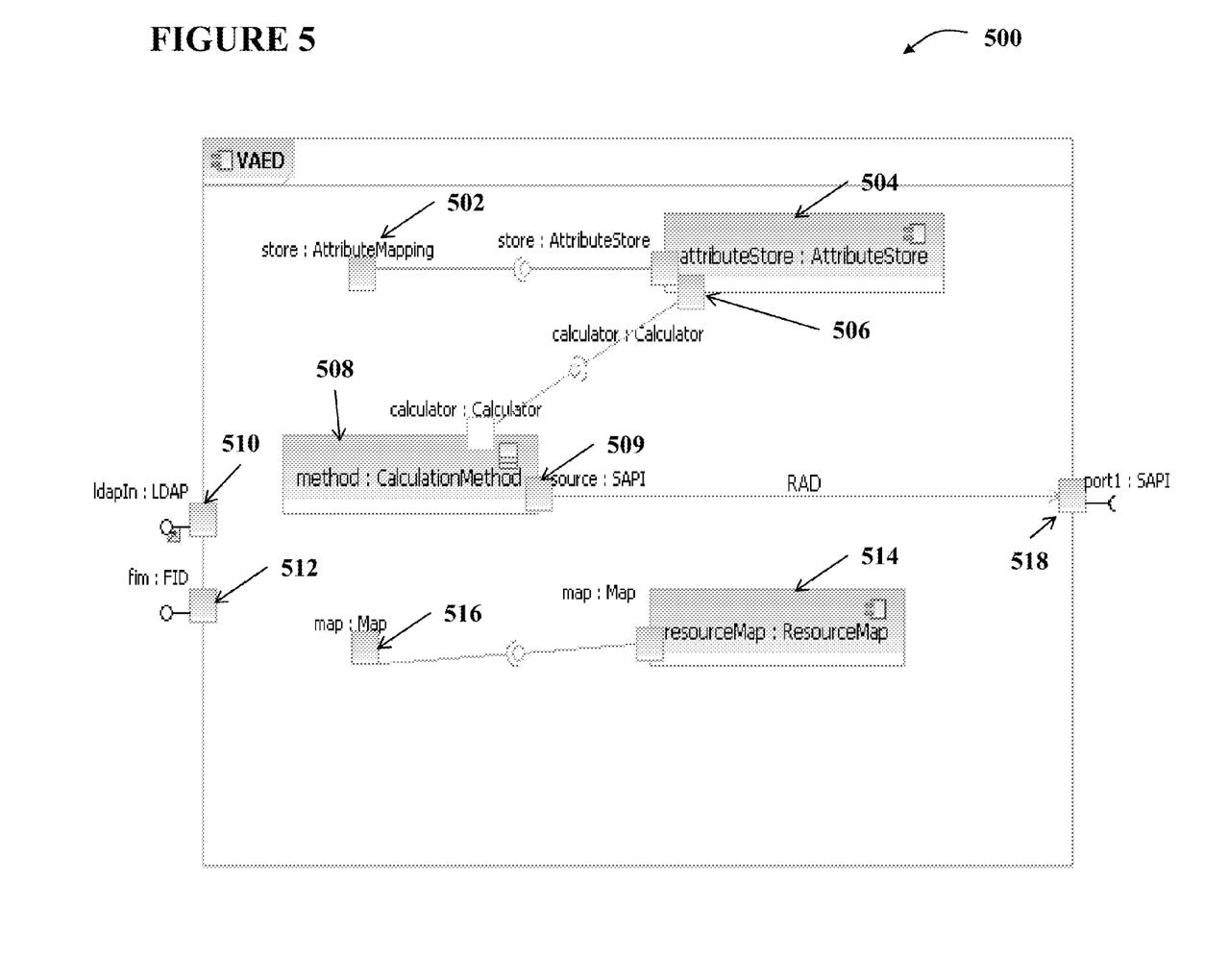
FIG. 5 illustrates a structure of the VAED

Internally, VAED 500 contains Attribute Store 504 and a Resource Map 514 (FIG. 5). VAED 500 also contains the federated attributes and Calculation Methods 508 that calculate the values of the virtual attributes from Attribute Store 504. Calculation Method(s) 508 extend their reach outside of the VAED 500 via external ports illustrated by the example port1 518. Calculation Method 508 uses the external port(s) 509, 510, 512, 518 to retrieve data from outside sources (e.g., devices, databases, etc.) needed for calculations.

VAED 500 possesses several measures to protect itself against compromised Value Calculation Method 408. The VAFM 204 digitally signs the Value Calculation Method 408 and Attribute 304. If the VAED 500 does not see the proper signature, it does not execute the Value Calculation Method 408/508. Within the VAED 500, the Value Calculation Method 408/508 executes in a restricted or "sandbox" environment with the ability to retrieve information from the Attribute Store 504 or through External Port(s) 518. This restricted environment prevents Value Calculation Method 408 from transmitting information outside of VAED 500 (potentially leaking information), reading information outside of VAED 500 (except through the designated ports), or changing anything in the Attribute Store 504. It also prevents the Value Calculation Method 408/508 from accessing any information that the executing user identity would not have access to from outside the VAED 500. These provisions protect the VAED 500 from compromised Value Calculation Method 408 that might have been federated from the VAFM.

VAED 500 uses its Resource Map 514 and ports to abstract the environment from the Value Calculation Methods 508. VAED 500 uses the Resource Map 514 to map the external ID of a federated instance to the internal ID of the local instance. When the VAFM 602 downloads a Value Calculation Method 508 to VAED 500, VAED 500 connects port 509 of the Value Calculation Method 508 to outgoing ports 518 of VAED 500 according to Resource Map 514. Resource Map 514 specifies for a given Value Calculation Method 508, which outgoing port to map to each port of the Value Calculation Method 508. This mapping may be different for each instance of the VAED. Each of the outgoing ports contains all of the information (e.g., address, user id, password) required to connect to the external data source. By containing different connection information in the outgoing ports, the various instances of the VAED can communicate with different instances of a Data Source with total transparency from the perspective of the Value Calculation Method. The outgoing ports contain all of the information (e.g., passwords, protocol) needed to communicate with external data sources. The outgoing ports and Resource Map must be configured prior to federation, or the federation process fails.

Figure 6:
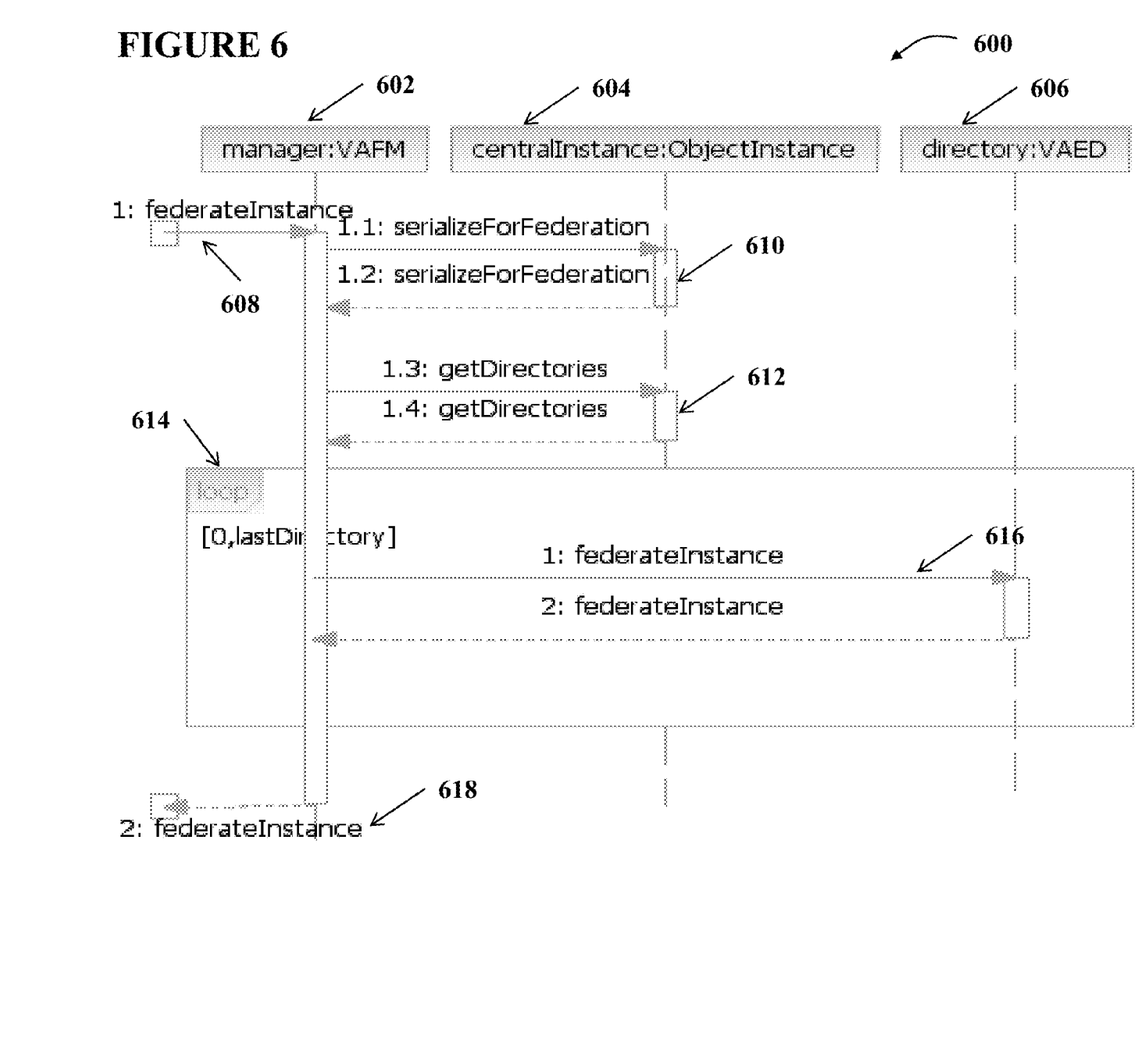
FIG. 6 illustrates a sequence of the federation steps between the VAFM and the VAED.

FIG. 6 shows process steps for federating virtual attributes 618. In central Instance Serialize For Federation 610, the instance with the virtual attribute is bundled up (serialized at 610) with its calculation methods, and calculation parameters for transportation to the VAEDs Next, the manager 602 invokes centralInstance.getDirectories 612 to get all of the directories for which the object instance should be federated.

The process then enters a loop 614 for federating the instance to all of the directories that apply. For each iteration of the loop, the manager invokes the directory.federateInstance 616, passing the serialized instance.

Figure 7:
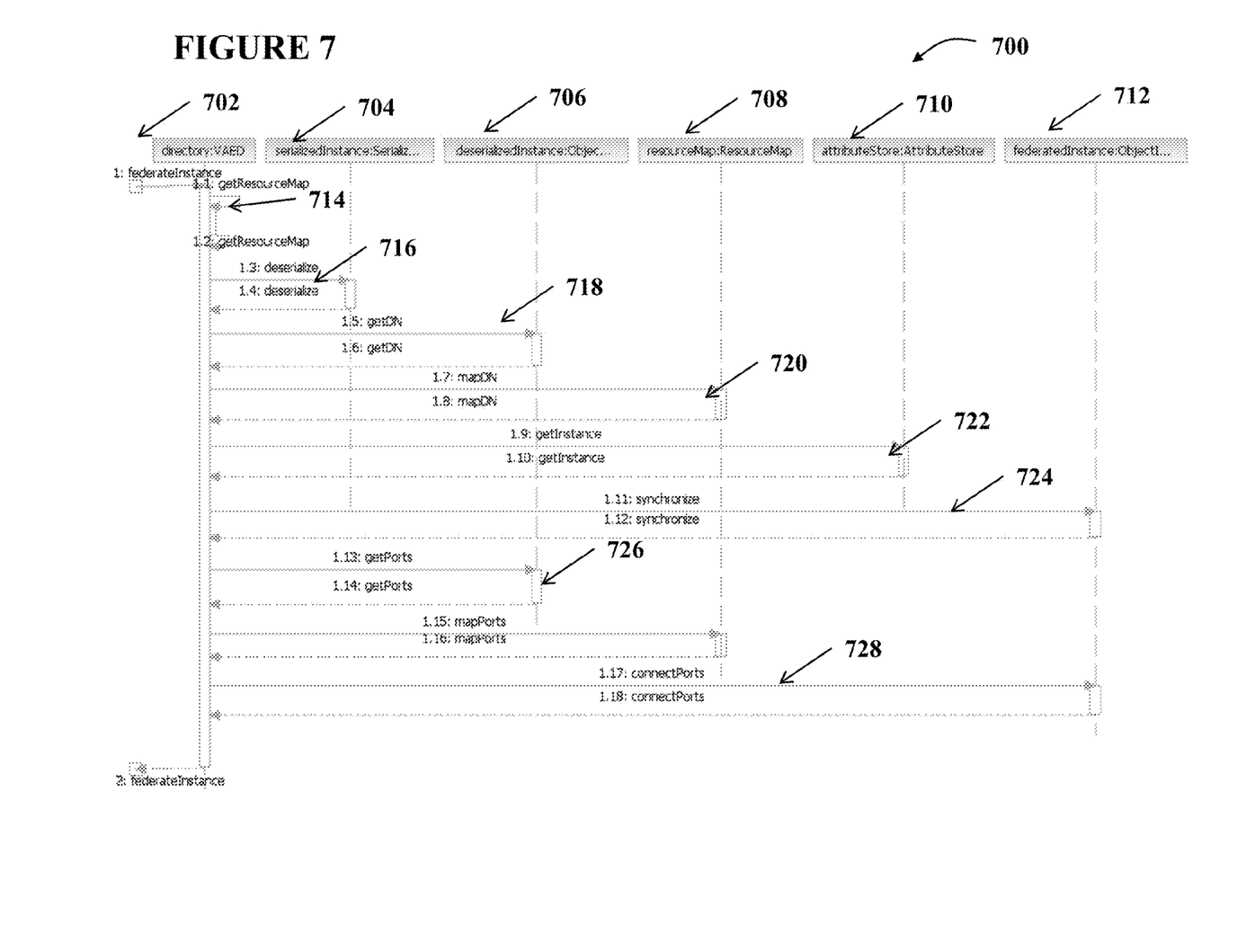
FIG. 7 illustrates a sequence of the federation steps to create a federateInstance.

Inside directory.federateInstance 616, the directory 702 first gets the ResourceMap 708 needed to map the needs of the federated instance against the running environment of the VAED. The directory then deserializes the serialized instance 704 that it was passed and gets its identifier as shown in FIG. 7. The directory 702 uses the ResourceMap 708 to map the identity of the serialized instance 704 to the local instance 712. The attributeStore 710 retrieves the instance based on the mapped local ID. The returned local instance then synchronizes parameters and calculation methods with the deserialized instance 706. The port requirements are then mapped and the local instance 712 connects the ports of its calculation method with the ports of the directory.

FIG. 2 illustrates how federation of multiple instances of a Virtual Attribute Enabled Directory (VAED) might be coordinated through a Virtual Attribute Federation Manager (VAFM). The diagram shows how the VAFM uses a Federated Attribute Interface (FAI) to communicate the changes of the virtual attributes to the VAED instances. For the sake of illustration, the VAED instances in this diagram communicate with different instances of the same Data Source.

Internally, both the VAFM and VAEDs have attribute stores. The attribute store of the VAFM 300 (FIG. 3) provides a central location for the directory object, and its virtual attributes. Structurally the VAFM attribute store is similar to the VAED attribute store 400 (FIG. 4). VAFM attribute store 300 (FIG. 3) lacks the AttributeValue for non-virtual attributes because these values can be propagated through traditional directory integration techniques. Many relationships are also missing in the VAFM as they are only needed in a functioning directory. The VAFM Directory has a serverAddress that the VAFM uses to connect to the VAEDs that need updating. It may also contain encrypted a user ID and a password for connecting to the VAEDs.

The VAED attribute store (FIG. 4) contains the structures needed for a functional directory. The Directory lacks the serverAddress attribute since the attribute store resides on a VAED server. An ObjectInstance can only reside in a single directory in the VAED, while the VAFM must be able to map an instance to multiple directories.

Internally, Virtual Attribute Federation System (VAFS) System 104 contains an Attribute Store and a Resource Map 142. VAFS 104 also contains the federated attributes and calculation methods 606 that calculate the values of the virtual attributes. VAFS 104 possesses several measures to protect VAEDs 208/210 against compromised Value Calculation Method 408, 508. VAFM 304 digitally signs Value Calculation Method 408, 508 and attributes. If the VAED 600 does not see the proper signature, it does not execute the Value Calculation Method 408, 508. Within the VAED, Value Calculation Method 408, 508 executes in a restricted or "sandbox" environment with the ability to retrieve information from the Attribute Store 504 or through outgoing ports 518. This restricted environment prevents the Value Calculation Method 508 from transmitting information outside of the VAED 500 (potentially leaking information), reading information outside of VAED 500 (except through the designated ports 518), or changing anything in the Attribute Store 504. It also prevents the Value Calculation Method 508 from accessing any information that the executing user identity would not have access to from outside the VAED 500. These provisions protect the VAED 500 from compromised Value Calculation Methods 408, 508 that might have been federated from the VAFM. VAED 500 uses its Resource Map 514 and ports to abstract the environment from the Value Calculation Methods 408, 508. VAED 500 uses the Resource Map 514 to map the external id of a federated instance to the internal ID of the local instance. When the FIM downloads a Value Calculation Method 408, 508 to VAED 500, VAED 500 connects the port(s) of Value Calculation Method 408, 508 to external ports of VAED 500 according to Resource Map 514. Resource Map 514 specifies for a given Value Calculation Method 408, 508, which outgoing ports 518 to map to each port of the Value Calculation Method 509. This mapping may be different for each instance of the VAED 500. Each of the outgoing ports 518 contains all of the information (e.g., address, user ID, password) required to connect to the external data source. By containing different connection information in the external ports, the various instances 208, 210 of the VAED 500 can communicate with different instances 212, 214 of a Data Source with total transparency from the perspective of the Value Calculation Method 508. The ports contain all of the information (e.g., passwords, protocol) needed to communicate with external data sources. The external ports 518 and Resource Map 514 must be configured prior to federation, or the federation process fails.

FIG. 6 illustrates System 600 having a manager:VAFM 602, centralinstance:Objectinstance 604, and directory: VAED 606. At 608, a federateInstance command is initiated from an external trigger to begin the federation of a given ObjectInstance. The first step in federateInstances is for the centralInstance:ObjectInstance 604 to be serialized with a serializeForFederation command 610. At 612, the centralinstance:Objectinstance 604 receives a getDirectories request 612 and responds with the directories to be updated. The federateInstance command uses a loop (from 0 until the lastDirectory 614) to federateInstances 616 to the directories 606 and results are returned at 618.

It should be understood that the present invention is typically computer-implemented via hardware and/or software. As such, client systems and/or servers will include computerized components as known in the art. Such components typically include (among others) a processing unit, a memory, a bus, input/output (I/O) interfaces, external devices, etc.

While shown and described herein as a system and method for virtual attribute federation that produces a consistent result at multiple directories, works in different domains across the enterprise, supports the retrieval of information from alternate sources in differing IT environments, supports different directory structures, protects the directory from compromised calculation methods, and reduces processor and network load. For example, in one embodiment, the invention provides a computer-readable/ useable virtual attribute federation that produces a consistent result at multiple directories, works in different domains across the enterprise, supports the retrieval of information from alternate sources in differing IT environments, supports different directory structures, protects the directory from compromised calculation methods, and reduces processor and network load. To this extent, the computer-readable/ useable medium includes program code that implements each of the various process steps of the invention. It is understood that the terms computer-readable medium or computer useable medium comprises one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory and/or storage system (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a computer-implemented method for virtual attribute federation that produces a consistent result at multiple directories, works in different domains across the enterprise, supports the retrieval of information from alternate sources in differing IT environments, supports different directory structures, protects the directory from compromised calculation methods, and reduces processor and network load. In this case, a computerized infrastructure can be provided and one or more systems for performing the process steps of the invention can be obtained (e.g., created, purchased, used, modified, etc.) and deployed to the computerized infrastructure. To this extent, the deployment of a system can comprise one or more of (1) installing program code on a computing device, such as computer system from a computer-readable medium; (2) adding one or more computing devices to the computer infrastructure; and (3) incorporating and/or modifying one or more existing systems of the computer infrastructure to enable the computerized infrastructure to perform the process steps of the invention.

As used herein, it is understood that the terms "program code" and "computer program code" are synonymous and may mean any expression, in any language, code or notation, of a set of instructions intended to cause a computing device having an information processing capability to perform a particular function either directly before or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

In another embodiment, the invention provides a business method that performs the process steps of the invention on a subscription, advertising, and/or fee basis. That is, a service provider, such as a solution integrator, could offer to deploy a computer infrastructure for virtual attribute federation that produces a consistent result at multiple directories, works in different domains across the enterprise, supports the retrieval of information from alternate sources in differing IT environments, supports different directory structures, protects the directory from compromised calculation methods, and reduces processor and network load. In this case, the service provider can create, maintain, and support, etc., the computer infrastructure by integrating computer-readable code into a computing system, wherein the code in combination with the computing system is capable of performing the process steps of the invention for one or more customers. In return, the service provider can receive payment from the customer(s) under a subscription and/or fee agreement and/or the service provider can receive payment from the sale of advertising content to one or more third parties.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A computer system for virtual attribute federation, the computer system comprising:
   a memory medium comprising program instructions;
   a bus coupled to the memory medium; and
   a processor for executing the program instructions comprising a virtual attribute federation manager (VAFM), the instructions causing the system to:
   sign an instance of a virtual attribute and a value calculation method with a signature;

federate the instance of the virtual attribute across each of a plurality of virtual attribute enabled directories (VAEDs) by mapping, for the virtual attribute according to the value calculation method, a federated instance external to the VAEDs to a local instance internal to the VAEDs, wherein at least one of the VAEDs is in a different domain than at least one other of the VAEDs; and execute, at each VAED, in response to a recognition by the VAED of the signature, the virtual attribute and value calculation method in a restricted environment, the restricted environment being abstracted by a resource map and external ports and the restricted environment preventing the value calculation method from: transmitting information outside of the VAED, reading information outside of the VAED except through the set of external ports, changing information in the attribute store, and accessing information that an executing user identity does not have access to from outside the VAED.

2. The system as defined in claim 1, further comprising a Federated Attribute Interface (FAI) connected to one or more directories.

3. The system as defined in claim 1, further comprising user directories connected to data sources.

4. The system as defined in claim 3, further comprising the user directories connecting to object classes.

5. The system as defined in claim 1, further comprising an object attribute connected to an object class that is mapped according to an attribute object mapping.

6. The system as defined in claim 1, wherein each of the VAEDs further comprises an attribute store element, an attribute mapping element, a calculation element, and a resource map element.

7. A computer-implemented method for virtual attribute federation, comprising:

signing an instance of a virtual attribute and a value calculation method with a signature;

federating the instance of the virtual attribute across each of a plurality of virtual attribute enabled directories (VAEDs) by mapping, for the virtual attribute according to the value calculation method, a federated instance external to the VAEDs to a local instance internal to the VAEDs, wherein at least one of the VAEDs is in a different domain than at least one other of the VAEDs; and executing, at each VAED, in response to a recognition by the VAED of the signature, the virtual attribute and value calculation method in a restricted environment, the restricted environment being abstracted by a resource map and external ports and the restricted environment preventing the value calculation method from: transmitting information outside of the VAED, reading information outside of the VAED except through the set of external ports, changing information in the attribute store, and accessing information that an executing user identity does not have access to from outside the VAED.

8. The method as defined in claim 7, further comprising:
passing virtual attributes to the VAEDs;
mapping the virtual attributes; and
calculating a value based upon the mapped virtual attributes.

9. The method as defined in claim 7, further comprising:
creating instance calculation parameters; and
passing the instance calculation parameters to one or more object instances.

10. The method as defined in claim 7, further comprising passing object classes to the VAEDs.

11. The method as defined in claim 7, further comprising:
connecting an object attribute to an object class; and
mapping the object class according to an attribute object mapping.

12. A computer program product for virtual attribute federation, the computer program product comprising a computer readable storage device, wherein the storage device does not include transitory signal, and program instructions stored on the computer readable storage device, to:

sign an instance of a virtual attribute and a value calculation method with a signature;

federate the instance of the virtual attribute across each of a plurality of virtual attribute enabled directories (VAEDs) by mapping, for the virtual attribute according to the value calculation method, a federated instance external to the VAEDs to a local instance internal to the VAEDs, wherein at least one of the VAEDs is in a different domain than at least one other of the VAEDs; and execute, at each VAED, in response to a recognition by the VAED of the signature, the virtual attribute and value calculation method in a restricted environment, the restricted environment being abstracted by a resource map and external ports and the restricted environment preventing the value calculation method from: transmitting information outside of the VAED, reading information outside of the VAED except through the set of external ports, changing information in the attribute store, and accessing information that an executing user identity does not have access to from outside the VAED.

13. The computer program product of claim 12, further comprising program instructions to:
pass virtual attributes to the VAEDs;
map the virtual attributes; and
calculate a value based upon the mapped virtual attributes.

14. The computer program product of claim 12, further comprising program instructions to:
create instance calculation parameters; and
pass the instance calculation parameters to one or more object instances.

15. The computer program product of claim 12, further comprising program instructions to pass object classes to the VAEDs.

16. The computer program product of claim 12, further comprising program instructions to:
connect an object attribute to an object class; and
map the object class according to an attribute object mapping.

* * * * *